United States Patent
Wood et al.

(10) Patent No.: US 7,225,740 B1
(45) Date of Patent: Jun. 5, 2007

(54) ELECTROMAGNETIC PULSE TRANSMITTING SYSTEM AND METHOD

(75) Inventors: James R. Wood, Grapevine, TX (US);
Roger W. Melin, Arlington, TX (US);
Mark K. Browder, Frisco, TX (US);
Steve E. Calico, Ft. Worth, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 0 days.

(21) Appl. No.: 10/998,398

(22) Filed: Nov. 29, 2004

Related U.S. Application Data

(62) Division of application No. 10/225,878, filed on Aug. 22, 2002, now Pat. No. 6,843,178.

(51) Int. Cl.
*F42C 13/04* (2006.01)
*G01N 33/22* (2006.01)

(52) U.S. Cl. .............. 102/214; 102/207; 102/217; 102/206; 102/212; 73/35.16; 73/35.15; 73/35.14

(58) Field of Classification Search .......... 102/214, 102/207, 217, 206, 212; 73/35.16, 35.15, 73/35.14, 35.07, 35.08; 361/248, 252, 251, 361/250

See application file for complete search history.

(56) References Cited

U.S. PATENT DOCUMENTS

| | | | | |
|---|---|---|---|---|
| 4,040,357 A | * | 8/1977 | Saunders | 102/214 |
| 5,805,110 A | * | 9/1998 | McEwan | 342/387 |
| 2002/0047544 A1 | * | 4/2002 | Nishikawa et al. | 315/111.21 |
| 2005/0251018 A1 | * | 11/2005 | Gleman | 600/407 |

* cited by examiner

*Primary Examiner*—Tuyet Thi Vo
(74) *Attorney, Agent, or Firm*—Daren C. Davis; James E. Walton

(57) ABSTRACT

A plasma antenna generator includes an ionizable material, an explosive charge capable of projecting the ionizable material upon detonation, and a detonator coupled with the explosive charge. An electromagnetic pulse transmitting system includes an electromagnetic pulse generator and a plasma antenna generator capable of reradiating an electromagnetic pulse emitted from the electromagnetic pulse generator. A method includes providing an explosive device comprising an ionizable material, detonating the explosive device to propel the ionizable material, and ionizing the ionizable material to form at least one plasma trail. A sensing system includes an electromagnetic pulse generator, a plasma antenna generator capable of reradiating an electromagnetic pulse emitted from the electromagnetic pulse generator, and a sensing system capable of receiving and analyzing at least a portion of the electromagnetic pulse after being reflected from an interface.

18 Claims, 10 Drawing Sheets

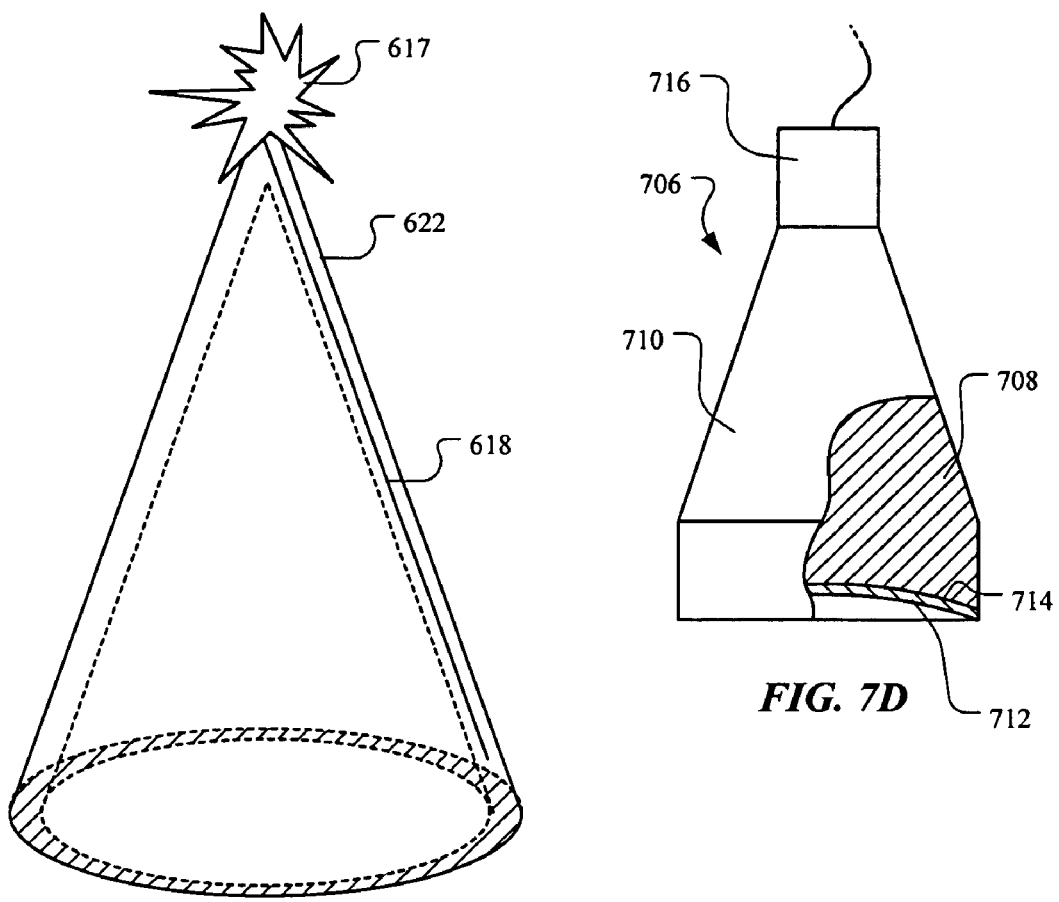
*FIG. 6D*
*FIG. 7D*
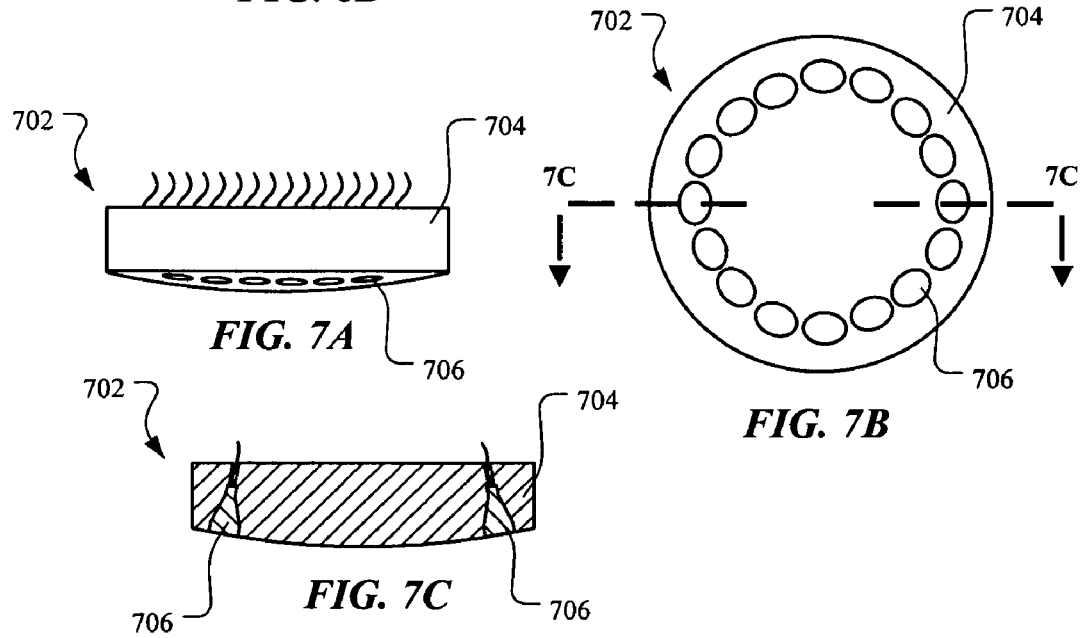
*FIG. 7A*
*FIG. 7B*
*FIG. 7C*

ELECTROMAGNETIC PULSE TRANSMITTING SYSTEM AND METHOD

CROSS-REFERENCE TO RELATED APPLICATIONS

The present application is a divisional of application Ser. No. 10/225,878, now U.S. Pat. No. 6,843,178 entitled "Electromagnetic Pulse Transmitting System and Method" by inventors Wood, Melin, Browder, Calico, filed on Aug. 22, 2002.

BACKGROUND OF THE INVENTION

1. Field of the Invention

This invention relates to a method and apparatus for transmitting an electromagnetic pulse. In one aspect, the invention relates to an electromagnetic pulse generator and a plasma antenna generator capable of forming a plasma antenna for reradiating an electromagnetic pulse from the electromagnetic pulse generator.

2. Description of the Related Art

Electromagnetic energy can be used in many ways to sense or affect objects from a distance. Radar, for example, is reflected electromagnetic energy used to determine the velocity and location of a targeted object. It is widely used in such applications as aircraft and ship navigation, military reconnaissance, automobile speed checks, and weather observations. Electromagnetic energy may also be used to jam or otherwise interfere with radio frequency transmissions or to affect the radio transmitting equipment itself.

In certain situations, it may be desirable to radiate one or more electromagnetic pulses over an area to sense or affect objects within the area. Generally, as illustrated in FIG. 1, a signal generator 102 generates an electromagnetic pulse, which is radiated by an antenna 104 as an electromagnetic wave 106. Upon encountering an interface, such as an interface between an object 108 and the air 110, a portion of the energy of the wave 106 is reflected as an electromagnetic wave 112. The reflected wave 112 may then be received by a sensor 114, which analyzes the reflected wave 112 to determine various characteristics of the object 108.

It is often desirable to deploy such antennas, e.g., the antenna 104, during flight. For example, a spacecraft approaching a planetary body may deploy an antenna so that electromagnetic energy may be directed toward the surface of the body. Conventional antennas generally include rigid or semi-rigid members that may be compactly folded for storage and transport and then unfolded when needed. Alternatively, conventional antennas may be wires that are explosively deployed or deployed by parachutes. A substantial amount of time is often required to deploy such antennas, which results in additional planning to determine the appropriate time to begin deployment so that the antenna will be available when needed. Further, circumstances may arise in which the immediate transmission of electromagnetic energy is desirable. If the antenna has not been deployed, there may not be sufficient time to deploy the antenna and transmit the electromagnetic energy in the desired time frame.

It may also be desirable in certain situations to transmit electromagnetic energy having a broad spectrum of frequencies or to transmit low frequency electromagnetic energy. Generally, longer antennas are capable of transmitting electromagnetic energy more efficiently at lower frequencies than shorter antennas. Such longer antennas may typically be capable of transmitting electromagnetic energy having higher frequencies as well. Longer foldable antennas require more storage space, may be more complex, and generally take longer to unfold.

The present invention is directed to overcoming, or at least reducing, the effects of one or more of the problems set forth above.

SUMMARY OF THE INVENTION

In one aspect of the present invention, a plasma antenna generator is provided. The plasma antenna generator includes an ionizable material, an explosive charge capable of projecting the ionizable material upon detonation, and a detonator coupled with the explosive charge.

In another aspect of the present invention, an electromagnetic pulse transmitting system is provided. The electromagnetic pulse transmitting system includes an electromagnetic pulse generator and a plasma antenna generator capable of reradiating an electromagnetic pulse emitted from the electromagnetic pulse generator.

In yet another aspect of the present invention, a method is provided including providing an explosive device comprising an ionizable material, detonating the explosive device to propel the ionizable material, and ionizing the ionizable material to form at least one plasma trail.

In another aspect of the present invention, an apparatus is provided that includes explosive means comprising an ionizable material, means for detonating the explosive means to propel the ionizable material, and means for ionizing the ionizable material to form at least one plasma trail.

In yet another aspect of the present invention, a sensing system is provided. The sensing system includes an electromagnetic pulse generator, a plasma antenna generator capable of reradiating an electromagnetic pulse emitted from the electromagnetic pulse generator, and a sensing system capable of receiving and analyzing at least a portion of the electromagnetic pulse after being reflected from an interface.

In another aspect of the present invention, an apparatus is provided that includes means for emitting an electromagnetic pulse and means for propelling an ionizable material to form at least one plasma trail for reradiating the electromagnetic pulse.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 6D is a stylized diagram of a generally hollow, conical pattern of plasma trails that may be formed by the explosive device of FIG. 6A;

FIG. 7A is a side view of a third illustrative embodiment of the explosive device of FIGS. 2A–2D, 4A, and 4B alternative to embodiments of FIGS. 5A–5D and FIGS. 6A–6D;

FIG. 7B is a bottom, plan view of the explosive device of FIG. 7A;

FIG. 7C is a cross-sectional view of the explosive device of FIGS. 7A and 7B taken along the line 7C—7C of FIG. 7B;

FIG. 7D is a partial cross-sectional, side view of an explosively formed projectile device of FIG. 7C;

Figure 1:
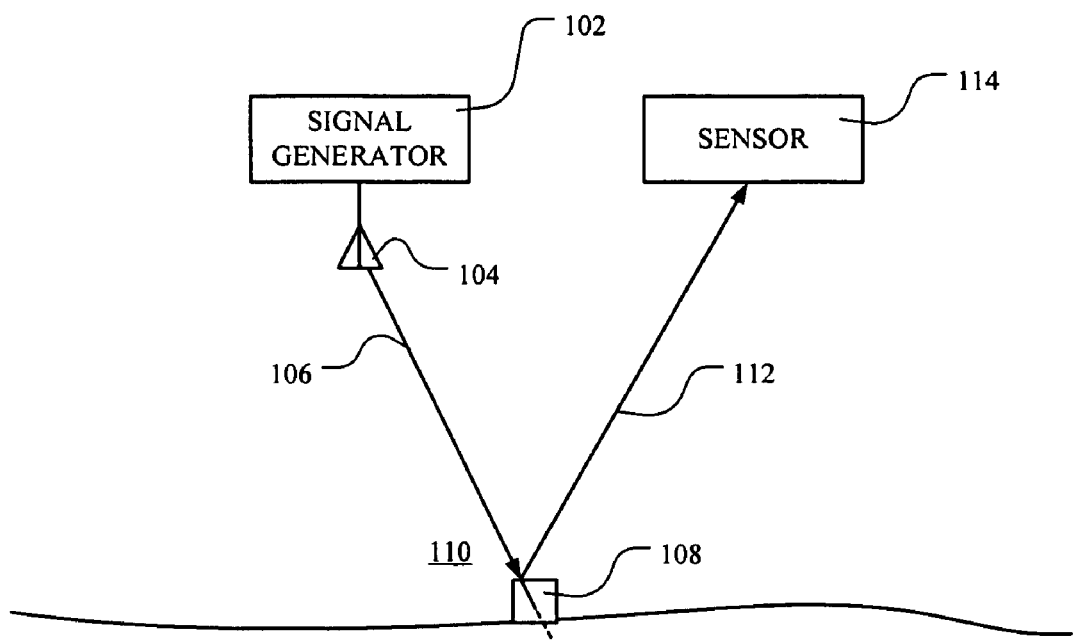
FIG. 1 is a stylized diagram of a conventional sensing system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2A:
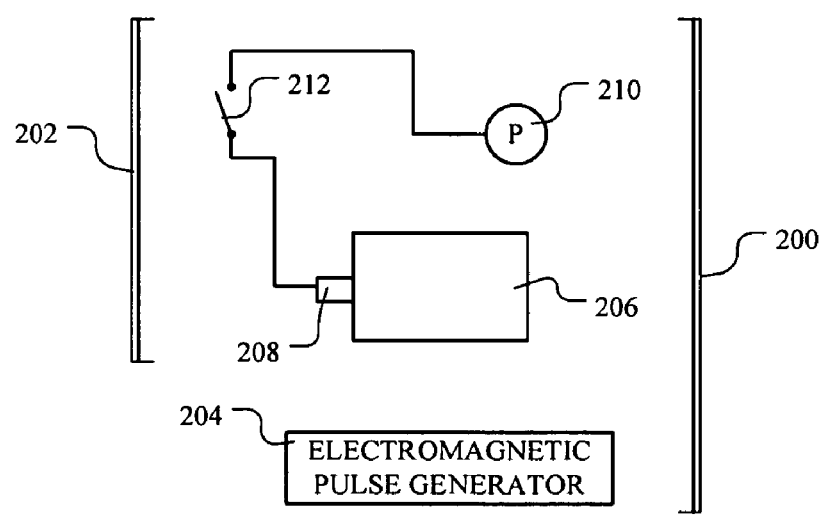
FIG. 2A is a stylized block diagram of a first illustrative embodiment of an electromagnetic pulse transmitting system according to the present invention.
Figure 2B:
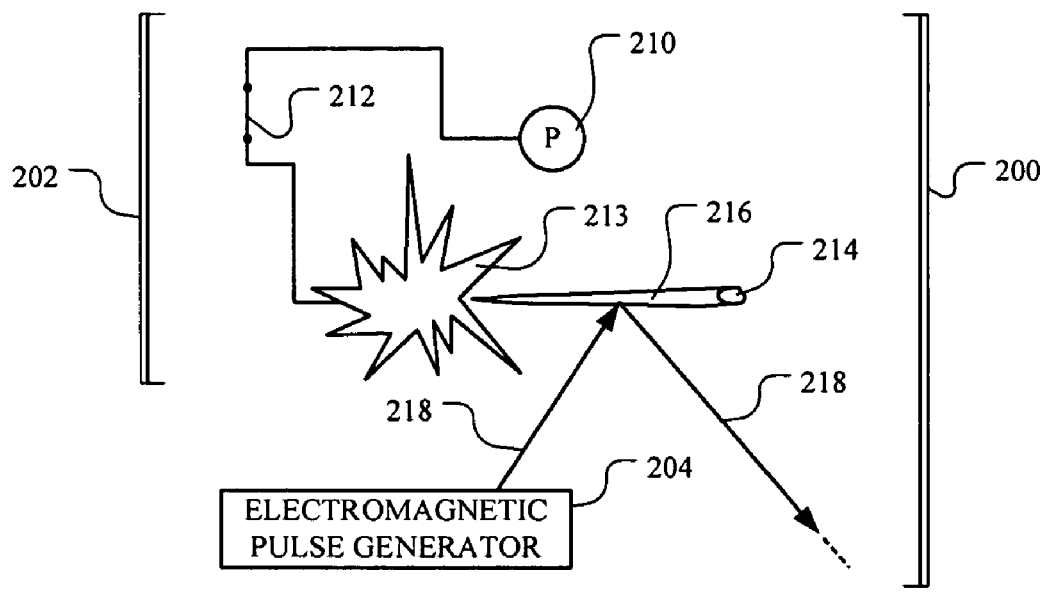
FIG. 2B illustrates the electromagnetic pulse transmitting system of FIG. 2A in operation.

A first embodiment of an electromagnetic pulse transmitting system according to the present invention is shown in FIGS. 2A and 2B. Referring to FIG. 2A, an electromagnetic pulse transmitting system 200 includes a plasma antenna generator 202 and an electromagnetic pulse generator 204. The plasma antenna generator 202 includes an explosive device 206 and a detonator 208 attached thereto for detonating the explosive device 206. A power source 210 is attached to the detonator 208 via a switch 212 that, when closed, provides a path for power from the power source 210 to fire the detonator 208 and detonate the explosive device 206. While a common throw-type switch is shown in FIG. 2 as the switch 212, the invention is not so limited. The switch 212 may be any switch known to the art.

The explosive device 206 includes an explosive charge (not shown), made of HMX (cyclotetramethylenetetranitramine), an HMX blend, RDX (cyclotrimethylenetrinitramine), an RDX blend, LX-14 (an HMX/estane blend), or the like. However, other suitable explosive materials may be employed. The explosive device 206 also includes an ionizable material that may be arranged in various configurations as will be more fully described below. Upon detonating the explosive device 206, as shown in FIG. 2B and represented by a graphic 213, particles 214 of the ionizable material are propelled by the explosive force through the air, in any chosen, random, or chance direction, and are aerodynamically heated. Only one of the particles 214 is shown in FIG. 2B for clarity. The particles 214 may be, for example, atoms, molecules, pieces, and/or slugs of the ionizable material.

As the particles 214 are heated by friction with the air as a result of the detonation, the ionizable material is ionized, producing plasma trails 216 (only one shown for clarity) of ions and free electrons. The free electrons act as an antenna, reradiating the electromagnetic pulse 218 from the electromagnetic pulse generator 204 having frequencies that are below the plasma cut-off frequency of the trail 216. Generally, electromagnetic pulses having frequencies that are equal to or greater than the plasma cut-off frequency propagate through the plasma. Electromagnetic pulses having frequencies that are below the plasma cut-off frequency are reflected by the plasma. The plasma cut-off frequency is generally proportional to the square root of the electron density of the plasma. Further, the plasma trails 216 may generally be longer than conventional antennas, thereby allowing electromagnetic pulses having lower frequencies (i.e., longer wavelengths) to be reradiated as compared to conventional antennas.

Figure 2C:
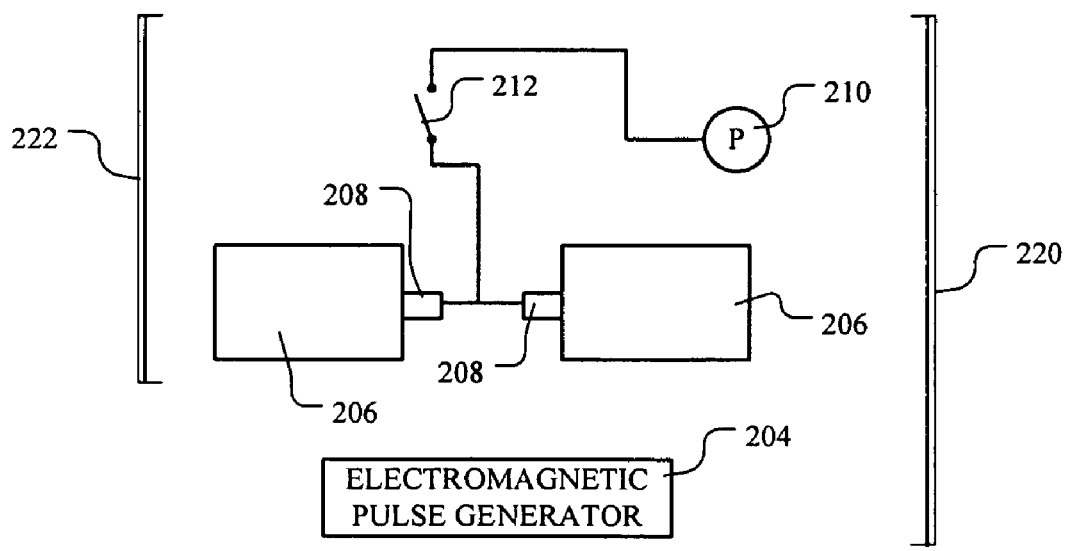
FIG. 2C is a stylized block diagram of a second illustrative embodiment of an electromagnetic pulse transmitting system alternative to that of FIGS. 2A and 2B according to the present invention.
Figure 2D:
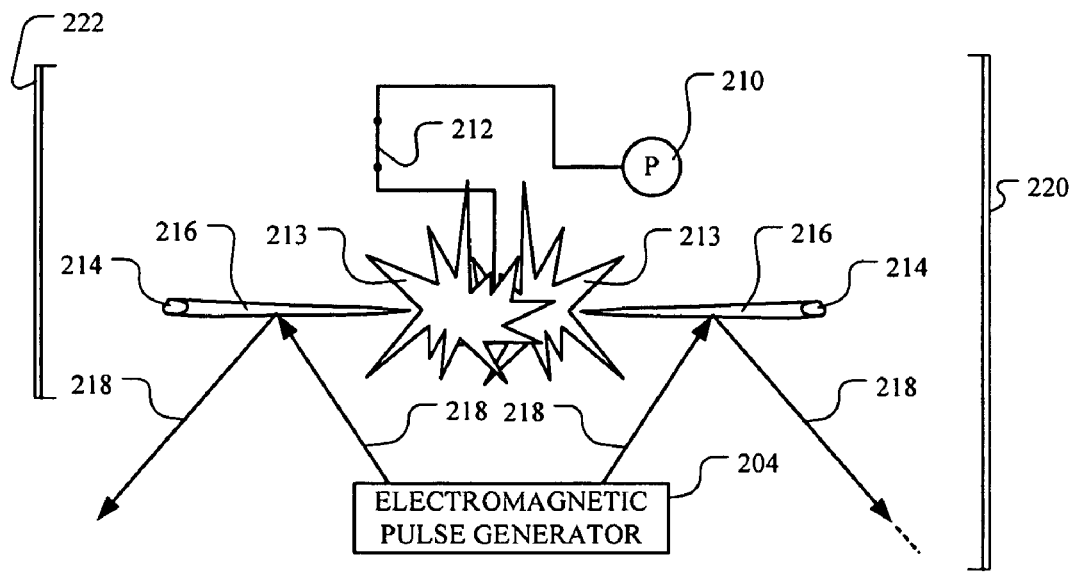
FIG. 2D illustrates the electromagnetic pulse transmitting system of FIG. 2C in operation.

While the electromagnetic pulse transmitting system 200 illustrated in FIGS. 2A and 2B includes only one explosive device 206, the present invention is not so limited and may include any number of explosive devices 206. For example, in a second embodiment, an electromagnetic pulse transmitting system 220, as shown in FIG. 2C, comprises a plasma antenna generator 222 that includes two explosive devices 206. Upon detonating the explosive devices 206, particles 214 are propelled in different directions, as shown in FIG. 2D. The resulting plasma trails 216 form a dipole-like antenna for reradiating the electromagnetic pulse emitted from the electromagnetic pulse generator 204. Any of the explosive devices 206, if more than one is present, may be configured to propel the particles in any chosen, random, or chance direction with respect to any of the other explosive devices 206.

The ionizable material (not shown in FIGS. 2A and 2B) may be made from any material capable of being ionized as a result of aerodynamic heating induced by being propelled by the explosive charge. For example, the ionizable material may be made of one or more alkali metals, may be made of a compound of one or more alkali metals, such as alkali salts, alkali carbonates, and the like, or may be a constituent of a compound of one or more alkali metals. Alkali metals include lithium, sodium, potassium, rubidium, cesium, and francium. Further, the ionizable material may be mechanically combined with another material. For example, the ionizable material may comprise particulates within another material or may comprise a layer affixed to another material. The ionizable material may be a component of a clathrate, in which particles of the ionizable material may be trapped within the crystal lattice of another material. The ionizable material may be a component of an intercalation compound, wherein particles of the ionizable material may be trapped between layers of another material's crystal lattice.

Figure 3A:
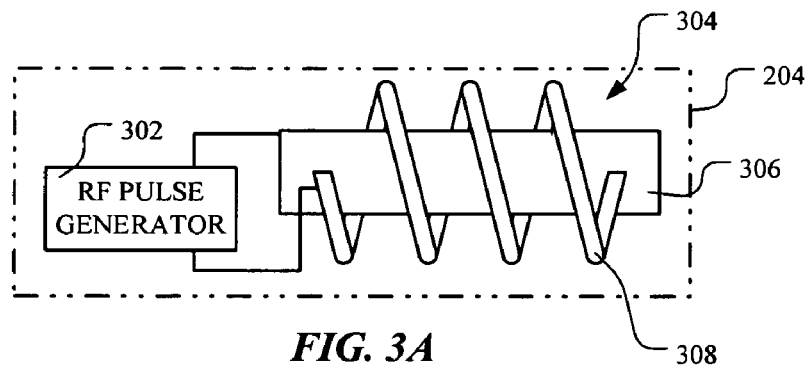
FIG. 3A is a stylized diagram of an illustrative embodiment of the electromagnetic pulse generator of FIGS. 2A–2D.

The electromagnetic pulse generator 204 may be any type of generator known to the art capable of generating an electromagnetic pulse. For example, as illustrated in FIG. 3A, the electromagnetic pulse generator 204 may be a radio frequency energy generator 302 electrically coupled with an explosive flux compressor 304. The explosive flux compressor 304 includes a metallic tube 306 (or "armature") containing a high explosive material, such as HMX, an HMX blend, RDX, an RDX blend, or LX-14. The high explosive material in the tube 306 may be of the same material as the explosive device 206 (shown in FIGS. 2A–2B), but this is not necessary to the practice of the invention. The tube 306 is disposed within a metallic coil 308 (or "stator"). The radio frequency energy generator 302 generates a current that flows through the tube 306 and the coil 308 that generates a magnetic field therebetween.

Figure 3B:
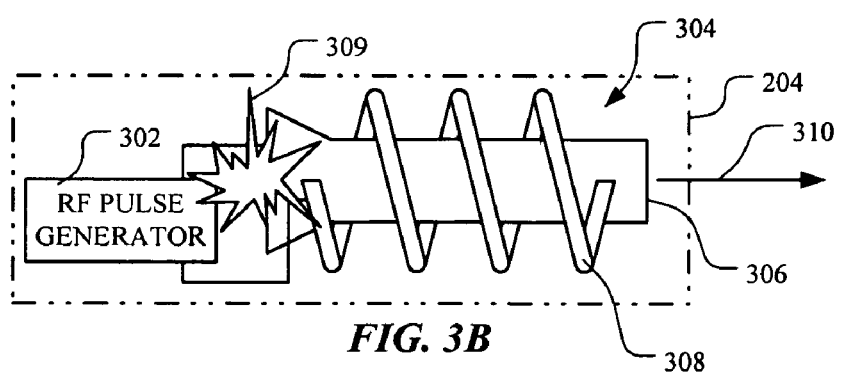
FIG. 3B is a stylized diagram of the electromagnetic pulse generator of FIG. 3A in operation.

Upon detonating the explosive material within the tube 306, as shown in FIG. 3B and represented by a graphic 309, the resulting blast flares the tube 308, which then contacts the coil 308. The resulting short circuit diverts the current, and the magnetic field produced by the current, into the undisturbed coil 308 ahead of the progressing blast. As the explosive front advances, the magnetic field is compressed into a smaller volume, which creates a substantial rise in the current flowing through the coil 308 ahead of the blast. Once the explosive front has progressed through the tube 306, the electromagnetic pulse flowing through the coil 308 is transmitted (as indicated by an arrow 310) to the plasma trail 218 and is thus reradiated.

Figure 4A:
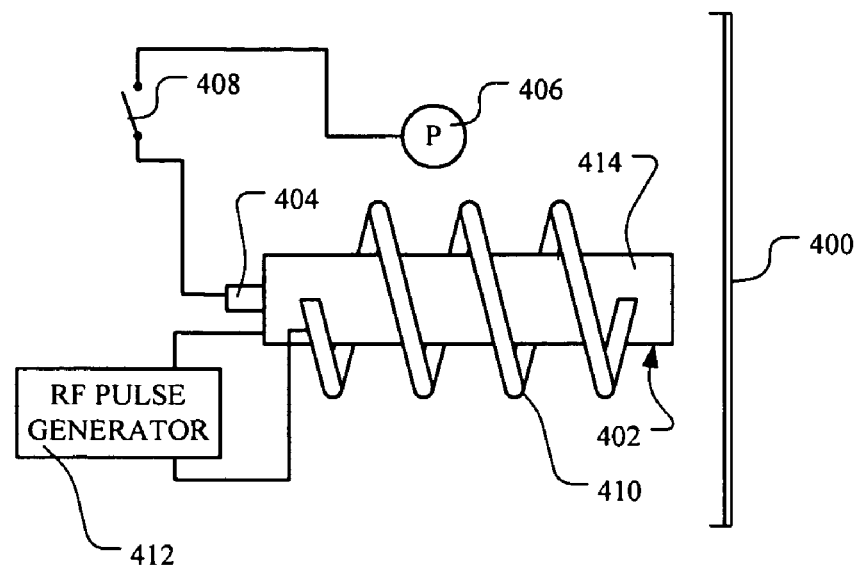
FIG. 4A is a stylized diagram of a third illustrative embodiment of an electromagnetic pulse transmitting system according to the present invention alternative to those in FIGS. 2A–2D.
Figure 4B:
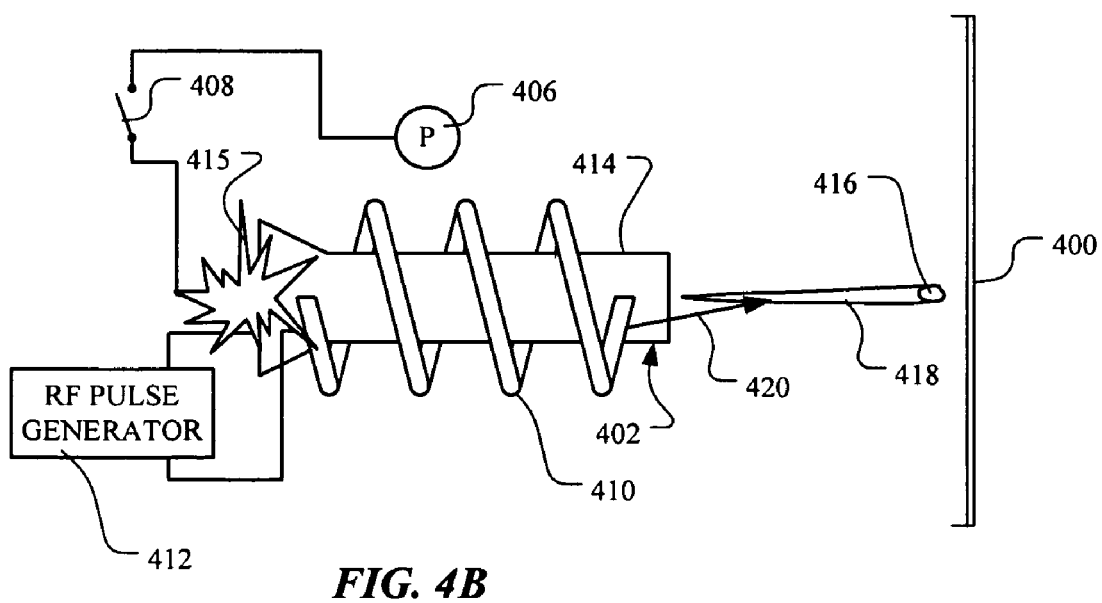
FIG. 4B is a stylized diagram of the electromagnetic pulse transmitting system of FIG. 4A in operation.

FIGS. 4A and 4B illustrate, in a third embodiment, an electromagnetic pulse transmitting system 400, in which the explosive flux compressor 304 (shown in FIGS. 3A and 3B) and the explosive device 206 (shown in FIGS. 2A and 2B) are combined into a single device. Referring now to FIG. 4A, the electromagnetic pulse transmitting system 400 includes an explosive device 402 and a detonator 404 attached thereto for detonating the explosive device 402. A power source 406 is attached to the detonator 404 via a switch 408 that, when closed, provides a path for power from the power source 406 to fire the detonator 404 and detonate the explosive device 402. As in the first embodiment, the switch 408 may be any switch known to the art. Further, the explosive device 402 includes an explosive charge, made of HMX, an HMX blend, RDX, an RDX blend, LX-14, or the like, and an ionizable material that may be arranged in various configurations as will be more fully described below.

Still referring to FIG. 4A, the explosive device 402, which includes a metallic tube 414 like the tube 306 of FIGS. 3A and 3B, is disposed within a metallic coil 410. A radio frequency energy generator 412 generates a current that flows through the tube 414 and the coil 410, thus generating a magnetic field therebetween. Upon detonation of the explosive device 402, as shown in FIG. 4B and represented by a graphic 415, the combination of the tube 414 and the coil 410 act as a explosive flux compressor, like the explosive flux compressor 304 of FIGS. 3A and 3B. Further, particles 416 (only one shown for clarity) of the ionizable material are expelled by the explosive blast from the detonated explosive device 402 to create a plasma trail 418. The electromagnetic pulse released from the coil 410 is transmitted (as indicated by an arrow 420) to the plasma trail 418 and is thus reradiated.

Figure 5A:
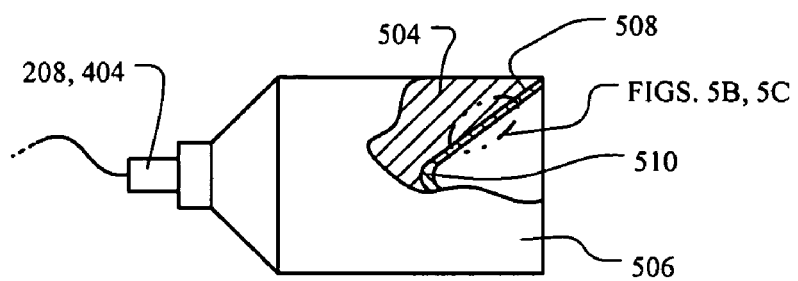
FIG. 5A is a stylized, partially cross-sectioned, side view of a first illustrative embodiment of an explosive device that may be employed in the embodiments of FIGS. 2A–2D, 4A, and 4B.

As indicated above, the explosive device 206, 402 may take many different forms. FIG. 5A illustrates a first embodiment of the explosive device 206, 402 according to the present invention. In the illustrated embodiment, the explosive device 206, 402 is a shaped charge device 502. Generally, shaped charge devices employ explosive products, created by detonating a highly explosive material, to create great pressures that accelerate a liner and form a very high-speed metal jet. In the illustrated embodiment, the shaped charge device 502 comprises an explosive charge 504 partially encased by a casing 506. The explosive charge 504 may be made of any explosive material known in the art having a high detonation velocity and/or high brisance, e.g., materials containing HMX, an HMX blend, RDX, an RDX blend, LX-14, or the like. Generally, a high detonation velocity explosive is characterized as that having a detonation velocity of at least about 6000 meters per second.

Still referring to FIG. 5A, a forward face 508 of the explosive charge 504, in the illustrated embodiment, is generally V-shaped in cross-section; however, the invention is not so limited. Rather, the forward face 508, and a liner 510 affixed to the forward face 508, may have any cross-sectional shape known to the art. The liner 510 comprises the ionizable material, as defined above, and any desired material appropriate for shaped charge liners. In various embodiments, the liner 508 may be made of the ionizable material and copper or a copper alloy.

Figure 5B:
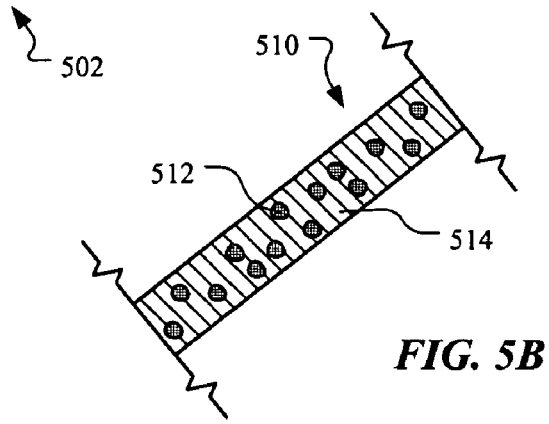
FIG. 5B is a cross-sectional view of a portion of a liner of FIG. 5A that includes a plurality of particles of ionizable material dispersed in a matrix.
Figure 5C:
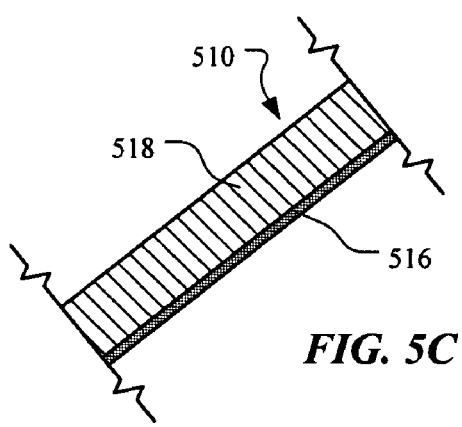
FIG. 5C is a cross-sectional view of a portion of the liner of FIG. 5A that includes a layer of the ionizable material affixed to a base alternative to that of FIG. 5B.

As illustrated in FIG. 5B, the liner 510 may include particles 512 of the ionizable material (only one indicated) in a matrix 514 of copper, a copper alloy, or any other shaped charge liner material. Alternatively, as shown in FIG. 5C, the liner 510 may include a layer 516 of the ionizable material affixed to a base 518 of copper, a copper alloy, or any other shaped charge liner material. The invention, however, encompasses any arrangement or configuration of ionizable material and shaped charge liner material for the liner 510.

Figure 5D:
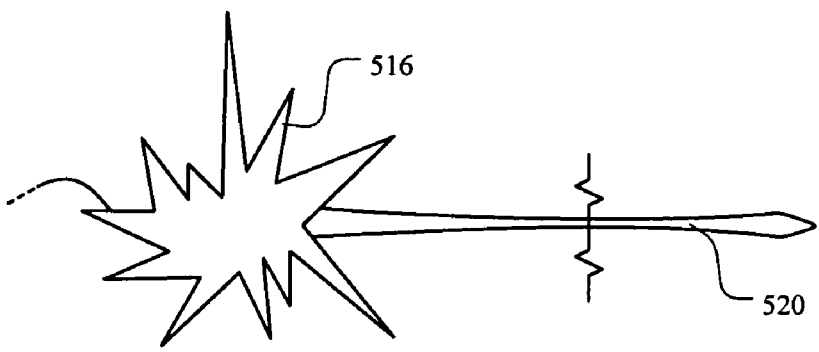
FIG. 5D is a stylized diagram of the explosive device of FIG. 5A in operation.

Referring now to FIG. 5D, upon detonation of the explosive charge 504 (represented by a graphic 516) by the detonator 208, 404, the liner 510 collapses inwardly and is projected forward as a jet 520 comprising the shaped charge liner material (e.g., the matrix 514 or the base 518) and the ionizable material (e.g., the particles 512 or portions of the layer 516). The plasma trails 216, 418 (as shown in FIGS. 2B and 4B, respectively) of ions and free electrons are generated as the ionizable material within the jet 520 is propelled through the air. Thus, the jet 520, which contains the plasma trails 216 418, may be used to reradiate the electromagnetic pulse 218 radiated from the signal generator 204 (illustrated in FIG. 2B) or to reradiate the electromagnetic pulse 420 from the coil 410 (illustrated in FIG. 4B).

Figure 6B:
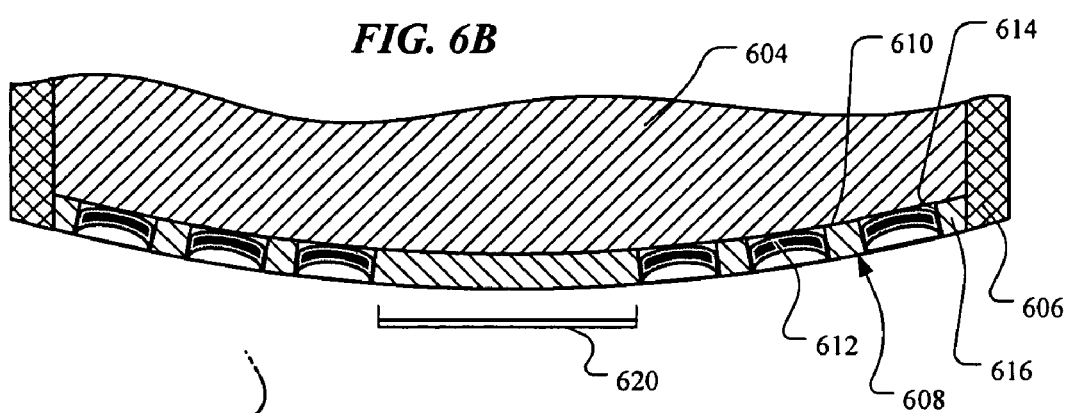
FIG. 6B is a cross-sectional view of a portion of an illustrative embodiment of a liner of FIG. 6A having a plurality of liners disposed in openings defined by a housing.
Figure 6A:
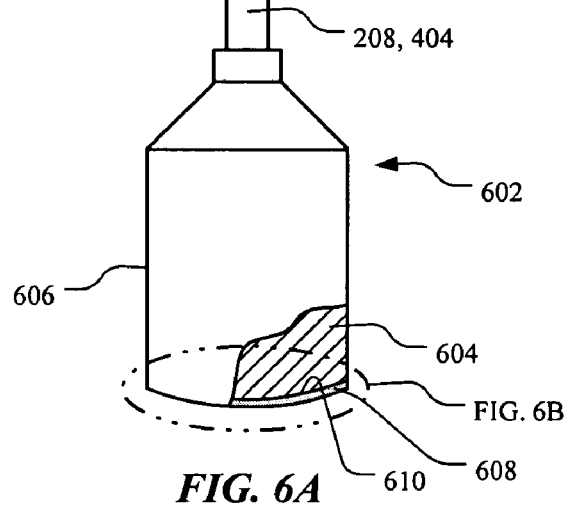
FIG. 6A is a partial cross-sectional, side view of a second embodiment of the explosive device of FIGS. 2A–2D, 4A, and 4B alternative to that in FIGS. 5A–5D.

Referring now to FIG. 6A, a second embodiment of the explosive device 206, 402 according to the present invention is shown. In the illustrated embodiment, the explosive device 206, 402 is an explosively formed projectile device 602. Generally, explosively formed projectile devices employ explosive products, created by detonating a highly explosive material, to create great pressures that accelerate a liner while simultaneously reshaping it into a rod or some other chosen shape.

In the illustrated embodiment, the explosively formed projectile device 602 comprises an explosive charge 604 partially encased by a casing 606. The explosive charge 604 may be made of any explosive material known in the art having a high detonation velocity and/or high brisance, as discussed above. The explosively formed projectile device 602 further includes a liner 608 affixed to a forward face 610 of the explosive charge 604. Both the forward face 610 and the liner 608 affixed thereto may have any desired shape. The liner 608 comprises the ionizable material, as defined above, and any material known to the art as being suitable for explosively formed projectile device liners. As in the first embodiment of the explosive device 206, 404, the liner 608 may be made of the ionizable material and copper or a copper alloy. Further, the liner 608 may have a construction such as that shown in FIGS. 5B and 5C.

Alternatively, as illustrated in FIG. 6B, the single liner 608 may be replaced by a plurality of liners 612 held within openings 614 defined by a housing 616. The liners 612 comprise the ionizable material, as defined above. While the liners 612 shown in FIG. 6B are concavely shaped, the invention encompasses liners 612 having any chosen shape.

Figure 6C:
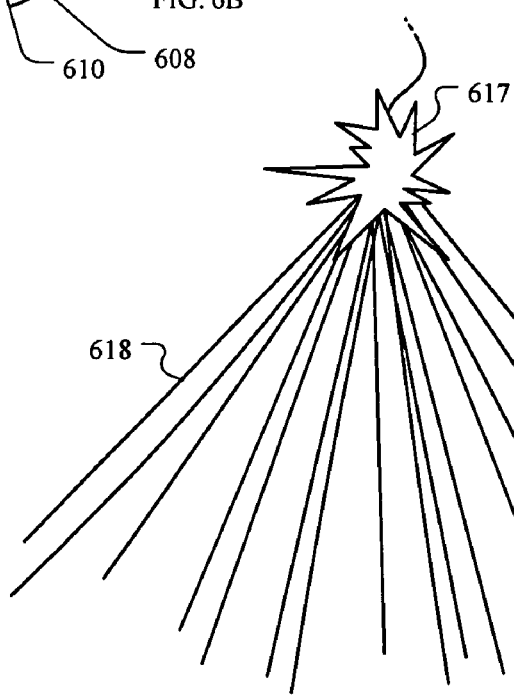
FIG. 6C is a stylized diagram of the explosive device of FIG. 6A in operation.

When the explosive charge 604 is detonated by the detonator 208, 404, the liners 612 are propelled by the resulting explosive force, as shown in FIG. 6C. Each of the liners 612 produces a plasma trail 618 (only one indicated) that can be used to reradiate the electromagnetic pulse emitted from the electromagnetic pulse generator 204 (as illustrated in FIG. 2B) or to reradiate the electromagnetic pulse emitted from the coil 410 (as illustrated in FIG. 4B).

In the embodiment illustrated in FIG. 6B, the liners 612 are arranged such that a central portion 620 of the housing 616 contains no slugs 616. As shown in FIG. 6D, such a configuration is designed to produce a hollow, conical pattern 622 of plasma trails 618 (only one shown). The present invention, however, encompasses any chosen configuration of liners 612 to produce a desired pattern of plasma trails 618.

FIGS. 7A–7D illustrate a third embodiment of the explosive device 206, 402 according to the present invention comprising a multiple explosively formed projectile device 702. Referring to FIGS. 7A–7C, a housing 704 contains a plurality of explosively formed projectile devices 706 held in a chosen configuration. Each of the devices 706 comprises an explosive charge 708 partially encased by a casing 710, as shown in FIG. 7D. The explosive charge 708 may be made of any explosive material known in the art having a high detonation velocity and/or high brisance, as discussed above. Each of the devices 706 further includes a liner 712 affixed to a forward face 714 of the explosive charge 708. Both the forward face 714 and the liner 712 affixed thereto may have any desired shape. The liner 712 comprises the ionizable material, as defined above, and any material known to the art as being suitable for explosively formed projectile device liners. As in the first embodiment of the explosive device 206, 404, the liner 712 may be made of the ionizable material and copper or a copper alloy. Further, the liner 712 may have a construction such as that shown in FIGS. 5B and 5C.

When each of the explosive charges 708 is detonated by the detonators 716, the liners 712 are propelled by the resulting explosive force in the same fashion as the second embodiment, as shown in FIG. 6C. Each of the liners 712 produces a plasma trail 618 (only one indicated in FIG. 6C) that can be used to reradiate the electromagnetic pulse emitted from the electromagnetic pulse generator 204 (as illustrated in FIG. 2B) or to reradiate the electromagnetic pulse emitted from the coil 410 (as illustrated in FIG. 4B).

In the embodiment illustrated in FIGS. 7A–7C, the devices 706 are arranged to produce a hollow, conical pattern similar to the conical pattern 622 of plasma trails 618 (only one shown) produced by the second embodiment, as shown in FIG. 6D. The present invention, however, encompasses any chosen configuration of liners 712 to produce a chosen pattern of plasma trails 618. For example, various devices 706 held by the housing 704 may have differing configurations of the liners 712.

Figure 8A:
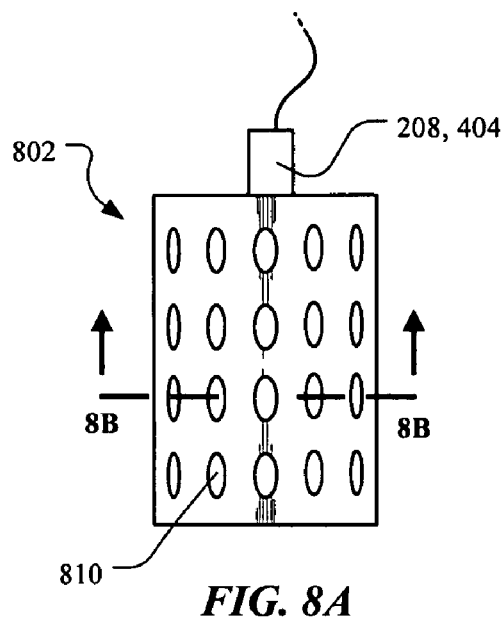
FIG. 8A is a side view of a fourth illustrative embodiment of the explosive device of FIGS. 2A–2D, 4A, and 4B alternative to the embodiments of FIGS. 5A–5D, FIGS. 6A–6D, and FIGS. 7A–7D.
Figure 8B:
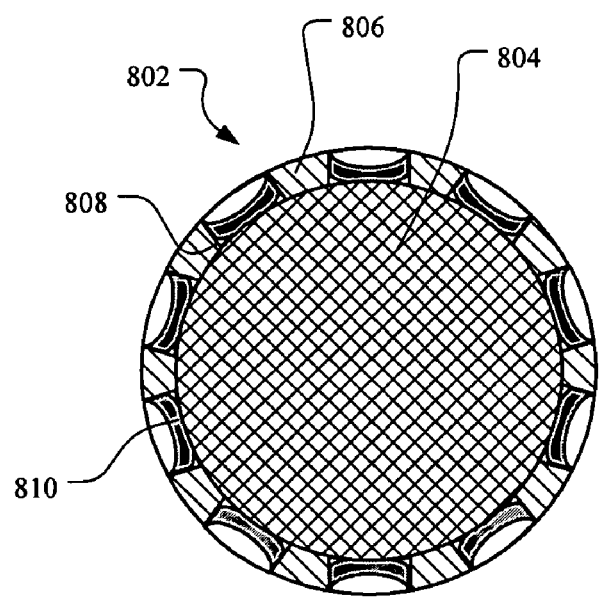
FIG. 8B is a cross-sectional view of the explosive device of FIG. 8A taken along the line 8B—8B in FIG. 8A.

FIGS. 8A and 8B illustrate a fourth embodiment of the explosive device 206, 402 according to the present invention comprising a radial explosively formed projectile device 802. The device 802 comprises an explosive charge 804 partially encased by a casing 806. The explosive charge 804 may be made of any explosive material known in the art having a high detonation velocity and/or high brisance, as discussed above. The casing 806 defines a plurality of openings 808 in which are disposed a corresponding plurality of liners 810. The liners 810 comprise the ionizable material, as defined above, and any material known to the art as being suitable for explosively formed projectile device liners. For example, the liners 810 may be made of the ionizable material and copper or a copper alloy. Further, the liners 810 may have a construction such as that shown in FIG. 5B or 5C. While the liners 810 shown in FIG. 8B are concavely shaped, the invention encompasses liners 810 having any chosen shape.

Figure 8C:
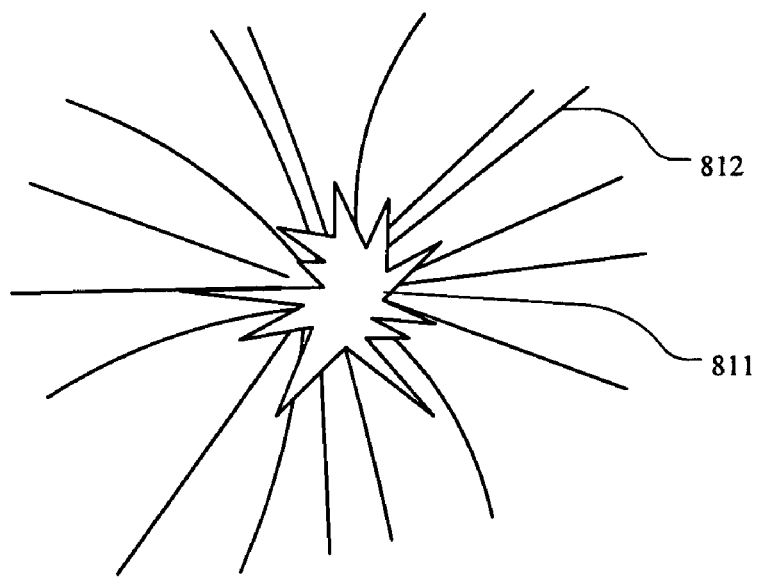
FIG. 8C is a stylized diagram of the explosive device of FIG. 8A in operation.

When the explosive charge 804 is detonated (represented by a graphic 811) by the detonator 208, 404, the liners 810 are propelled by the resulting explosive force, as shown in FIG. 8C. Each of the liners 810 produces a plasma trail 812 (only one indicated) that can be used to reradiate the electromagnetic pulse emitted from the electromagnetic pulse generator 204 (as illustrated in FIG. 2B) or to reradiate the electromagnetic pulse emitted from the coil 410 (as illustrated in FIG. 4B).

Figure 9A:
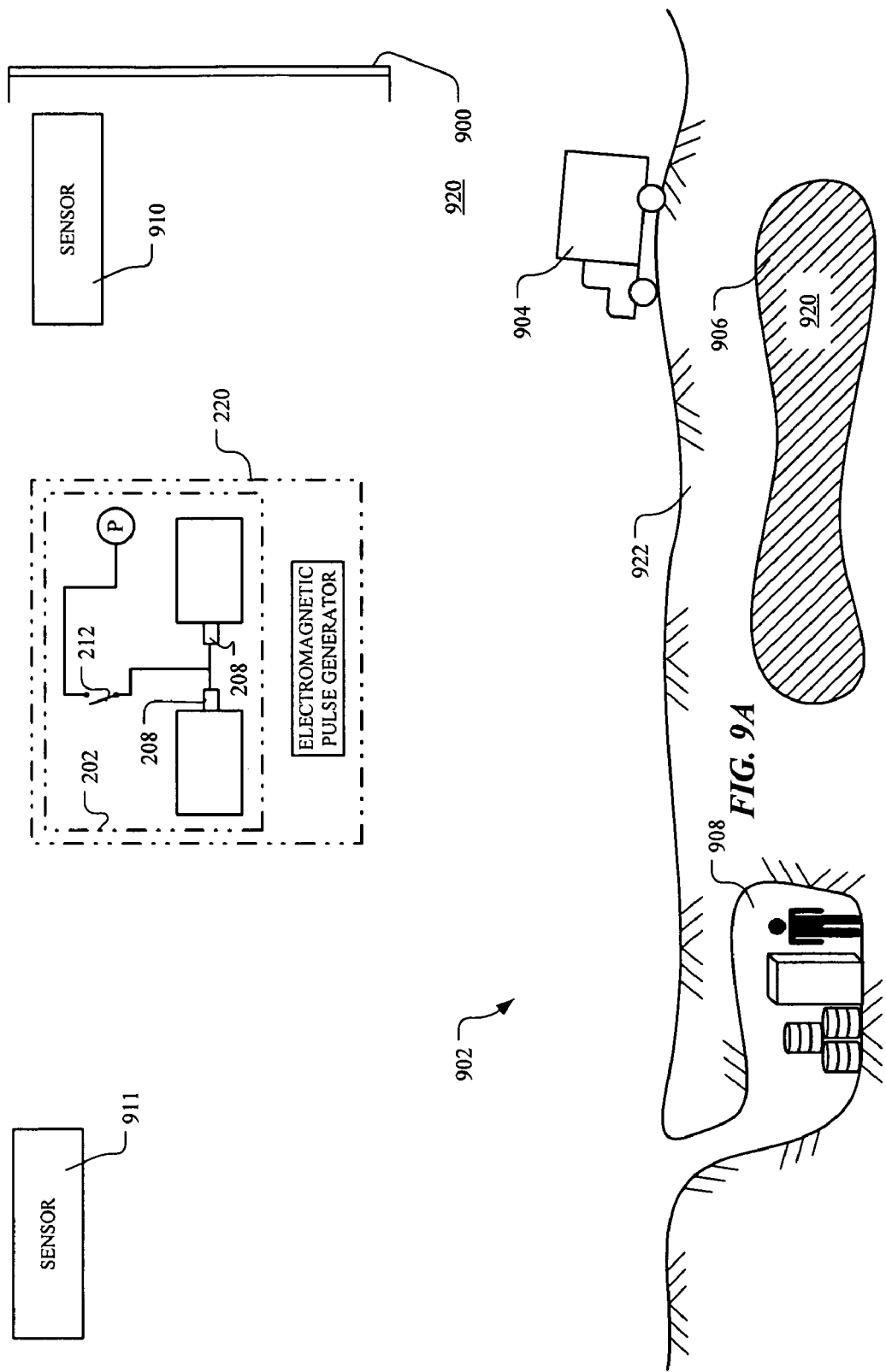
FIG. 9A is a stylized diagram of an illustrative embodiment of a sensing system according to the present invention.

In certain situations, it may be desirable to radiate one or more electromagnetic pulses over an area to sense or affect objects within the area and to sense structures, such as caves, bunkers, shelters, caverns and pools underground within the area. FIG. 9A illustrates an embodiment of a sensing system 900 including the electromagnetic pulse transmitting system 220, first shown in FIGS. 2A–2B, and sensors 910, 911. However, any electromagnetic pulse transmitting system as described herein may be used. In the illustrated embodiment, the electromagnetic pulse transmitting system 220 is located over an area 902. A truck 904, an underground pool 906, and a cavern 908 are located within the area 902. The sensors 910, 911 are shown above the area; however, they may alternatively be located within the area 902 or in any chosen location, as will be more fully described later. There also may be any chosen number of sensors 910, 911 and they may be of similar or different configurations to make various analyses as known to the art.

Figure 9B:
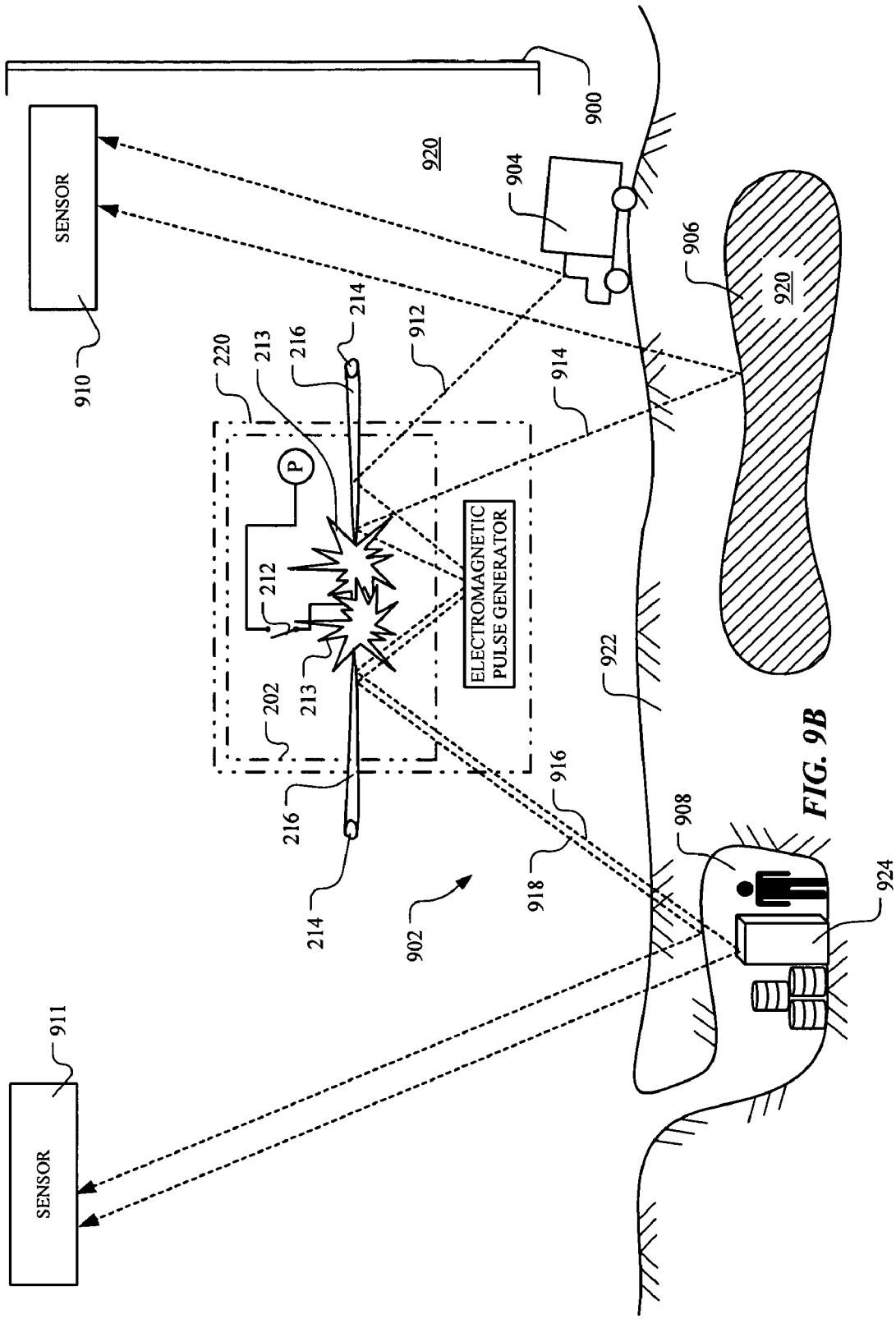
FIG. 9B is a stylized diagram of the sensing system of FIG. 9A in operation.

Referring now to FIG. 9B, the electromagnetic pulse transmitting system 220 is activated, as described above, to radiate electromagnetic pulses 912, 914, 916, 918 toward the area 902. In the illustrated embodiment, at least a portion of the electromagnetic pulse 912 is reflected by an interface between the truck 904 and air 920 and is then received by the sensor 910. At least a portion of the electromagnetic pulse 914 is reflected by an interface between the pool 906 and the surrounding ground 922 and is then received by the sensor 910. Similarly, at least a portion of the electromagnetic pulse 916 is reflected by an interface between an article 924 (or some other article) within the cavern 908 and the air 920 within the cavern and is then received by the sensor 911. Further, at least a portion of the electromagnetic pulse 918 is reflected by an interface between the ground 922 defining the cavern 908 and the air 920 within the cavern 908 and is then received by the sensor 911. Each of the sensors 910, 911 may be placed in any chosen location such that it is capable of receiving the desired electromagnetic pulses 912, 914, 916, 918.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system, comprising:
   an electromagnetic pulse generator;
   a plasma antenna generator for generating a plasma antenna, such that the plasma antenna reradiates an electromagnetic pulse emitted from the electromagnetic pulse generator; and
   a sensing system for receiving and analyzing at least a portion of the electromagnetic pulse after being reflected from an interface.

2. A system, according to claim 1, wherein the electromagnetic pulse generator comprises
   a radio frequency energy generator; and
   an explosive flux compressor, electrically coupled with the radio frequency energy generator, for compressing energy generated by the radio frequency energy generator and producing the electromagnetic pulse.

3. A system, according to claim 1, wherein the sensing system is disposed above ground level.

4. A system, comprising:
   an electromagnetic pulse generator;
   a plasma antenna generator for generating a plasma antenna, such that the plasma antenna reradiates an electromagnetic pulse emitted from the electromagnetic pulse generator; and
   a sensing system for receiving and analyzing at least a portion of the electromagnetic pulse after being reflected from an interface, wherein:
   the plasma antenna generator further comprises an explosive device comprising an ionizable material and for projecting the ionizable material therefrom upon detonation; and
   at least one detonator coupled with the explosive device.

5. A system, according to claim 4, wherein the ionizable material comprises a material selected from the group consisting of an alkali metal, a compound of an alkali metal, a constituent of the compound of the alkali metal, a clathrate of an alkali metal, a constituent of the clathrate of the alkali metal, an intercalation compound of an alkali metal, and a constituent of the intercalation compound of the alkali metal.

6. A system, according to claim 4, wherein the explosive device further comprises a shaped charge device.

7. A system, according to claim 4, wherein the explosive device further comprises an explosively formed projectile device.

8. A system, according to claim 4, wherein the explosive device further comprises:
   a casing defining a cavity therein and a plurality of openings therethrough;
   an explosive charge disposed with the cavity; and
   a plurality of liners comprising the ionizable material received in the plurality of openings.

9. A system, according to claim 4, wherein the ionizable material comprises an alkali metal, a compound of the alkali metal, a constituent of the compound of the alkali metal, a clathrate of the alkali metal, a constituent of the clathrate of the alkali metal, an intercalation compound of the alkali metal, or a constituent of the intercalation compound of the alkali metal.

10. A system, according to claim 1, wherein the system is senses or affects an object within an area over which the electromagnetic pulse is reradiated.

11. A system, according to claim 10, wherein the object comprises a cave, a bunker, a shelter, a cavern, a pool, or a vehicle.

12. A system, according to claim 4, wherein the explosive device further comprises:
    a casing defining a cavity therein;
    an explosive charge disposed with the cavity and having a forward face; and
    a liner comprising the ionizing material affixed to the forward face of the explosive charge.

13. A system, according to claim 12, wherein the liner further comprises a plurality of particles of the ionizing material dispersed in a matrix.

14. A system, according to claim 12, wherein the liner further comprises a base and a layer of the ionizing material affixed thereto.

15. A system, according to claim 4, wherein the explosive device further comprises:
    a housing defining a plurality of openings therein; and
    a plurality of shaped charge devices or a plurality of explosively formed devices received in the openings.

16. A system, according to claim 15, wherein the plurality of openings are defined by the housing such that the plurality of shaped charge devices or the plurality of explosively formed devices for producing a generally hollow, conical pattern of plasma trails upon their detonation.

17. A system, according to claim 4, wherein the explosive device further comprises:
   a casing defining a cavity therein;
   an explosive charge disposed with the cavity and having a forward face; and
   a housing defining a plurality of openings therethrough and affixed to the forward face of the explosive charge; and
   a plurality of liners comprising the ionizable material received in the plurality of openings.

18. A system, according to claim 17, wherein the plurality of openings are defined by the housing such that the plurality of liners are capable of producing a generally hollow, conical pattern of plasma trails upon detonation of the explosive charge.

* * * * *